(12) United States Patent
Del Valle Irizarry

(10) Patent No.: US 11,794,268 B2
(45) Date of Patent: Oct. 24, 2023

(54) METAL CUTTING DEVICE

(71) Applicant: Alberto Del Valle Irizarry, Lake Land, FL (US)

(72) Inventor: Alberto Del Valle Irizarry, Lake Land, FL (US)

( * ) Notice: Subject to any disclaimer, the term of this patent is extended or adjusted under 35 U.S.C. 154(b) by 137 days.

(21) Appl. No.: 17/408,439

(22) Filed: Aug. 22, 2021

(65) Prior Publication Data
US 2023/0054231 A1    Feb. 23, 2023

(51) Int. Cl.
*B23K 9/28* (2006.01)
*B23K 9/013* (2006.01)

(52) U.S. Cl.
CPC .............. *B23K 9/287* (2013.01); *B23K 9/013* (2013.01)

(58) Field of Classification Search
CPC ........ B23K 9/10; B23K 9/0737; B23K 9/126; B23K 9/0956; B23K 9/0282; B23K 9/32; B23K 9/26; B23K 9/173; B23K 9/295; B23K 9/287; B23K 9/013
USPC ... 219/130.1, 137.31, 137.2, 137.43, 137.63, 219/137.61, 137.9, 121.48
See application file for complete search history.

(56) References Cited

U.S. PATENT DOCUMENTS

| | | | | |
|---|---|---|---|---|
| 1,684,476 | A * | 9/1928 | Cullen | F23D 14/42 266/70 |
| 6,439,515 | B1 * | 8/2002 | Powers | F16M 13/04 248/129 |
| 2007/0210049 | A1 * | 9/2007 | Dingeldein | B23K 9/295 219/137.61 |
| 2009/0230107 | A1 * | 9/2009 | Ertmer | B23K 37/00 219/136 |

* cited by examiner

*Primary Examiner* — Phuong T Nguyen
(74) *Attorney, Agent, or Firm* — The Iwashko Law Firm, PLLC; Lev Ivan Gabriel Iwashko

(57) ABSTRACT

A metal cutting device, including a main body, a plurality of legs pivotally disposed on at least a portion of the main body to suspend the main body over a surface, a handle assembly removably connected to at least a portion of the main body to facilitate gripping thereof, and a torch removably connected within at least a portion of the main body to cut the surface in response to contact with the surface.

7 Claims, 7 Drawing Sheets

METAL CUTTING DEVICE

CROSS REFERENCE TO RELATED APPLICATION

This application claims the benefit of, and incorporates by reference, U.S. provisional patent application Ser. No. 63/126,029, entitled "Metal Cutting Device," which was filed on Dec. 16, 2020.

BACKGROUND

1. Field

The present general inventive concept relates generally to a cutting device, and particularly, to a metal cutting device.

2. Description of the Related Art

Metal workers have a difficult job due to the nature of cutting metal. Moreover, cutting metal is a daily task which can be incredibly problematic when the proper tools are unavailable. Modern metal cutting devices lack mobility and stability, which increases the probability of hazardous accidents occurring.

Furthermore, these modern tools tend to lack ingenuity and are challenging to handle by users due to the density of the materials being sculpted. The cumbersome design of the modern metal cutting devices prevents smooth and precise shapes from being made in the metal.

Therefore, there is a need for a metal cutting device that allows precise cutting of the metal and enhances safety during use.

SUMMARY

The present general inventive concept provides a metal cutting device.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a metal cutting device, including a main body, a plurality of legs pivotally disposed on at least a portion of the main body to suspend the main body over a surface, a handle assembly removably connected to at least a portion of the main body to facilitate gripping thereof, and a torch removably connected within at least a portion of the main body to cut the surface in response to contact with the surface.

The main body may include a torch receiving aperture to receive the torch therethrough, and a torch fastener movably disposed on at least a portion of the main body to prevent movement of the torch in response to moving the torch fastener toward a center of the torch receiving aperture, and allow movement of the torch in response to moving the torch fastener away from the center of the torch receiving aperture.

Each of the plurality of legs may include a first section pivotally disposed at a first end to at least a portion of the main body to pivot in a first direction away from the surface and pivot in a second direction toward the surface, a second section removably connected at a first end to a second end of the first section to adjust a height of the main body with respect to the surface by moving the moving the main body toward the first end of the second section, and moving the main body toward a second end of the second section in response to moving the first section along a length of the second section, and a section fastener removably connected to the first section and the second section to allow the second section to adjust the height of the main body in response to movement of the first section along the length of the second section.

The handle assembly may include a handle body, a handle connector disposed on at least a portion of a first end of the handle body and removably connected to the torch, and a grip portion disposed on at least a portion of a second end of the handle body to facilitate gripping thereof.

The handle assembly may further include a handle lever disposed on at least a portion of the grip portion to adjust a strength of the torch in response to moving the handle lever.

The handle assembly may further include a movable portion connected to the grip portion, and a plurality of handle tracks disposed on at least a portion of the handle body to facilitate movement of the movable portion along at least a portion of a length of the handle body.

The metal cutting device may further include a plurality of wheel assemblies removably connected to each of the plurality of legs to rotate against the surface in response to an application of force thereto.

BRIEF DESCRIPTION OF THE DRAWINGS

These and/or other features and utilities of the present generally inventive concept will become apparent and more readily appreciated from the following description of the embodiments, taken in conjunction with the accompanying drawings of which.

DETAILED DESCRIPTION

Figure 1A:
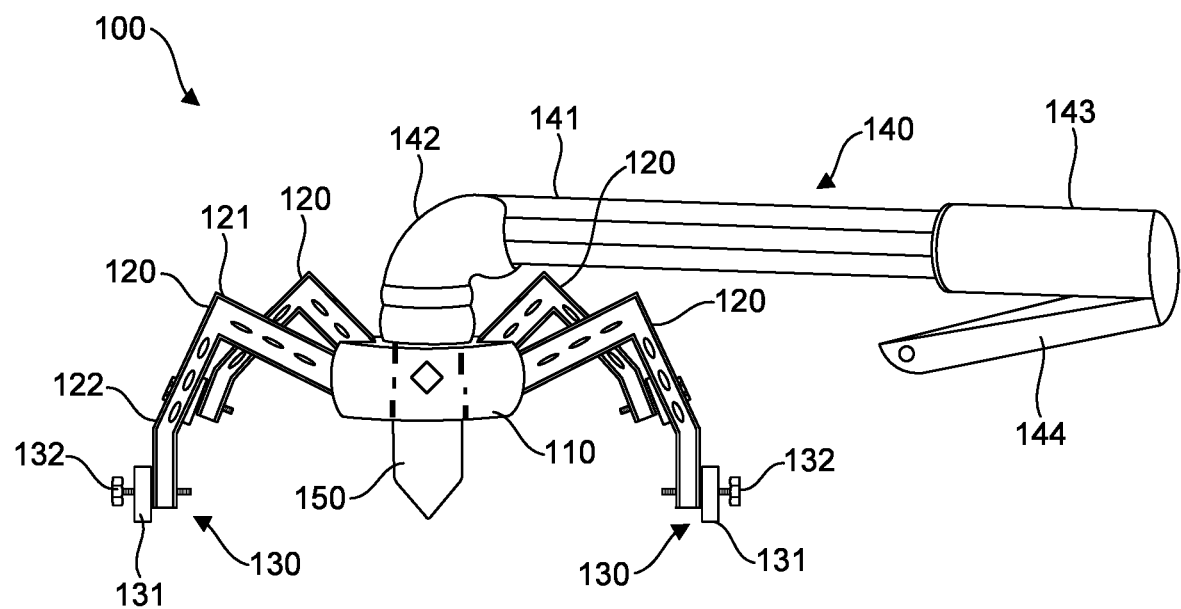
FIG. 1A illustrates a side perspective view of a metal cutting device, according to an exemplary embodiment of the present general inventive concept.

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

LIST OF COMPONENTS

Metal Cutting Device 100
Main Body 110
Torch Receiving Aperture 111
Torch Fastener 112
Legs 120
First Portion 121
Second Portion 122
Wheel Assemblies 130
Wheel 131
Wheel Fastener 132
Handle Assembly 140
Handle Body 141
Handle Connector 142
Grip Portion 143
Handle Lever 144
Torch 150
Wheel Track 160
Wheel Receiving Surface 161
Rims 162
Magnets 163
Metal Cutting Device 200
Main Body 210
Torch Receiving Aperture 211
Torch Fastener 212
Legs 220
First Section 221
Second Section 222
Section Fastener 223
Wheel Assemblies 230
Wheel 231
Wheel Fastener 232
Metal Cutting Device 300
Main Body 310
Torch Receiving Aperture 311
Torch Fastener 312
Handle Assembly 240
Handle Body 241
Handle Connector 242
Grip Portion 243
Movable Portion 244
Handle Tracks 245
Handle Gear 246
Wheel Assembly 330
Wheel 331
Cover 332
Bearing 333

FIG. 1A illustrates a side perspective view of a metal cutting device 100, according to an exemplary embodiment of the present general inventive concept.

Figure 1B:
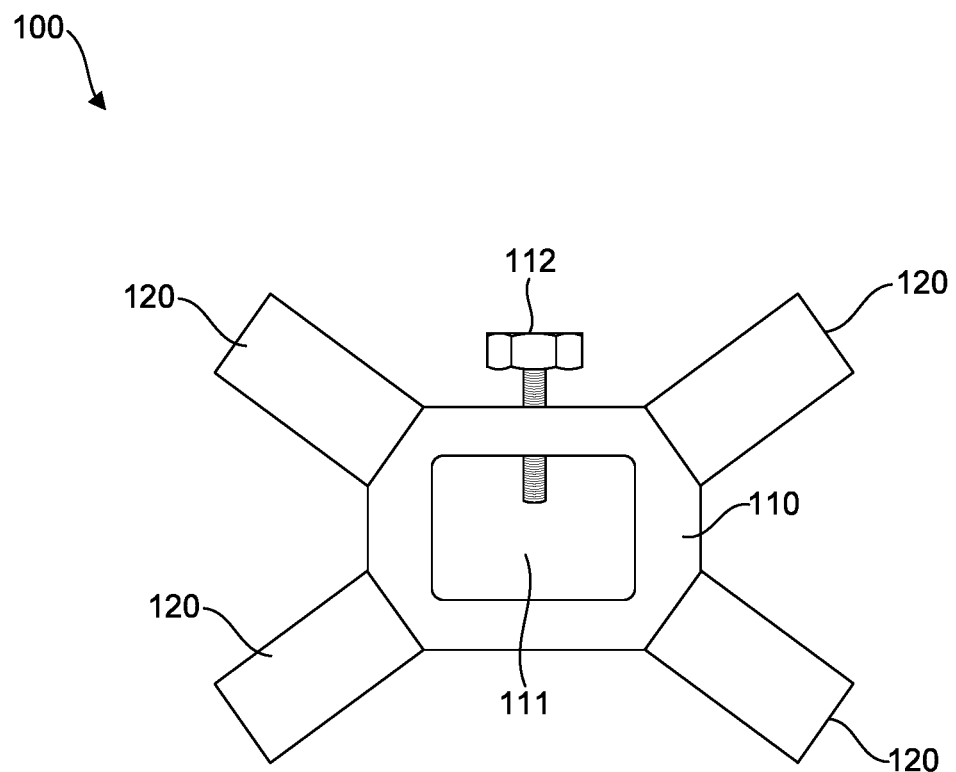
FIG. 1B illustrates an elevational top view of a main body, according to an exemplary embodiment of the present general inventive concept.

FIG. 1B illustrates an elevational top view of a main body 110, according to an exemplary embodiment of the present general inventive concept.

The metal cutting device 100 may be constructed from at least one of metal, plastic, wood, ceramic, and rubber, etc., but is not limited thereto. Additionally, the metal cutting device 100 may be highly durable and withstand high heat temperatures commonly found in a metal working environment. In other words, the metal cutting device 100 may be stable and not melt despite exposure to heat.

The metal cutting device 100 may include a main body 110, a plurality of legs 120, a plurality of wheel assemblies 130, a handle assembly 140, and a torch 150, but is not limited thereto.

The main body 110 may have a predetermined size. For example, a length of the main body 110 may be one inch and have a thickness of three-sixteenths of an inch, but is not limited thereto.

The main body 110 may include a torch receiving aperture 111 and a torch fastener 112, but is not limited thereto.

Referring to FIG. 1B, the torch receiving aperture 111 is illustrated to have a rounded rectangular shape. However, the torch receiving aperture 111 may be rectangular, circular, conical, triangular, pentagonal, hexagonal, heptagonal, octagonal, or any other shape known to one of ordinary skill in the art, but is not limited thereto.

The torch receiving aperture 111 may be disposed on and/or within at least a portion of a center of the main body 110.

The torch fastener 112 may be disposed on at least a portion of the main body 110. Moreover, the torch fastener 112 may move within the torch receiving aperture 111 toward a center of the torch receiving aperture 111 in response to rotation of the torch fastener 112 in a first rotational direction (i.e. clockwise) or a second rotational direction (i.e. counterclockwise), and move away from (i.e. out of) the torch receiving aperture 111 in response to rotation of the torch fastener 112 in the second rotational direction or the first rotational direction.

Each of the plurality of legs 120 may include a first portion 121 and a second portion 122, but is not limited thereto.

Referring again to FIG. 1B, the plurality of legs 120 may be pivotally disposed on at least a portion of the main body 110. More specifically, each of the plurality of legs 120 may have a spring to connect to the main body 110 and/or a hinge to connect to the main body 110, such that the plurality of legs 120 may pivot in a first vertical direction (i.e. up) or a second vertical direction (i.e. down) with respect to a planar surface (e.g., a metal plate, a metal bar, a metal rod, etc.). For example, the plurality of legs 120 may suspend the main body 110 over the planar surface.

Additionally, each of the plurality of legs 120 may be bent ninety degrees at the first portion 121 and acutely bent toward the main body 110 at the second portion 122. As such, the plurality of legs 120 may collectively have a spider shape. The plurality of legs 120 may facilitate adjustment of height of the main body 110 above the planar surface due to the spider shape and ability to pivot with respect to the main body 110.

Each of the plurality of wheel assemblies 130 may include a wheel 131 and a wheel fastener 132, but is not limited thereto.

The wheel fastener 132 may include a screw, a nail, a nut, a bolt, a washer, a magnet, an adhesive, and/or any combination thereof, but is not limited thereto.

Each of the plurality of wheel assemblies 130 may be removably connected to at least one of the plurality of legs 120. More specifically, the wheel 131 may be removably connected to at least one of the plurality of legs 120 via the wheel fastener 132. The wheel 131 may rotate in response to a force applied thereto, such as pushing and/or pulling of the main body 110 and/or at least one of the plurality of legs 120.

The handle assembly 140 may include a handle body 141, a handle connector 142, a grip portion 143, and a handle lever 144, but is not limited thereto.

The handle body 141 may have a predetermined size (i.e. length and width) based on a safety determination during cutting of the planar surface.

The handle connector 142 may be disposed on at least a portion of a first end of the handle body 141. The handle connector 142 may curve to be perpendicular with respect to the handle body 141. Additionally, the handle connector 142 may be removably connected to the main body 110.

The grip portion 143 may be disposed on at least a portion of a second end of the handle body 141. The grip portion 143 may facilitate gripping thereof. As such, the handle assembly 140 may be used to move the main body 110, the plurality of legs 120, and/or the plurality of wheel assemblies 130, such that the wheels 131 rotate on the planar surface. For example, the main body 110, the plurality of legs 120, and/or the plurality of wheel assemblies 130 may rotate at any angle on the planar surface in response to movement of the handle assembly 140 with respect to a direction of movement along the planar surface, such that different angles and/or degrees may be cut on the planar surface.

Furthermore, the handle lever 144 may be disposed on at least a portion of the grip portion 143.

The torch 150 may include an acetylene torch and a butane torch but is not limited thereto.

The torch 150 may be removably connected within at least a portion of the torch receiving aperture 111 and/or the handle connector 142 through the torch receiving aperture 111. Also, the torch 150 may be prevented from moving from the torch receiving aperture 111 in response to moving the torch fastener 112 toward the center of the torch receiving aperture 111. Conversely, the torch 150 may move away from the torch receiving aperture 111 in response to moving the torch fastener 112 away from the center of the torch receiving aperture 111.

Furthermore, a strength (i.e. heat level and/or size, such as width) of the torch 150 may be adjusted in response to moving (i.e. squeezing) the handle lever 144. As such, an amount of gas (e.g., acetylene, butane) provided to the torch 150 may be increased and/or decreased based on moving and/or releasing the handle lever 144, respectively.

Accordingly, the torch 150 may cut the planar surface, such as the metal plate, in response to contacting the planar surface. Moreover, the handle assembly 140 may allow precise control of the torch 150 through movement of the main body 110, the plurality of legs 120, and/or the plurality of wheel assemblies 130.

Figure 2A:
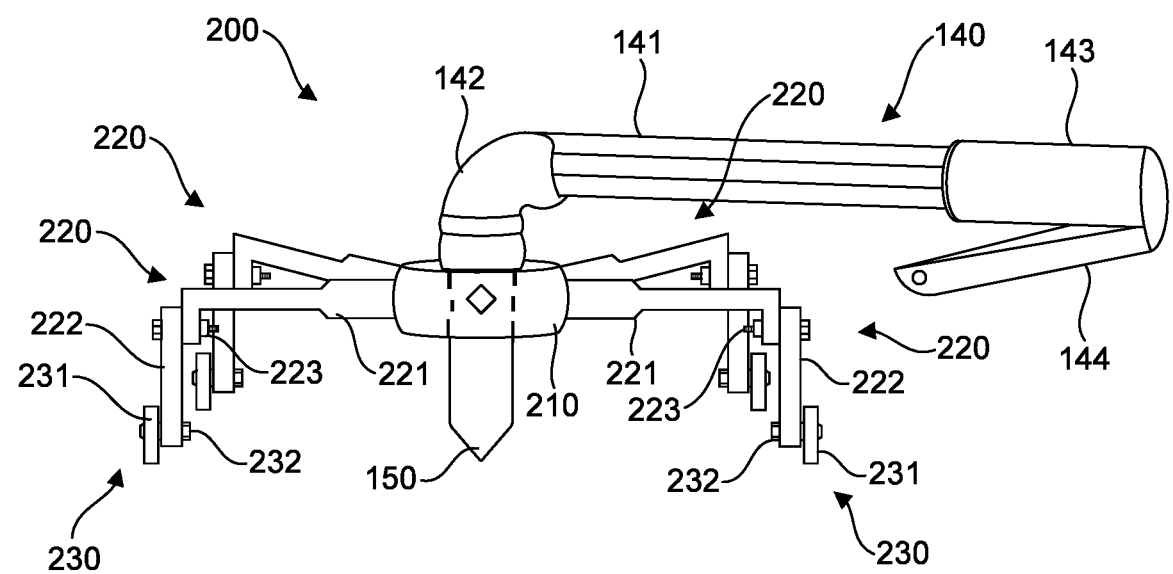
FIG. 2A illustrates a side perspective view of a metal cutting device, according to another exemplary embodiment of the present general inventive concept.

FIG. 2A illustrates a side perspective view of a metal cutting device 200, according to another exemplary embodiment of the present general inventive concept.

Figure 2B:
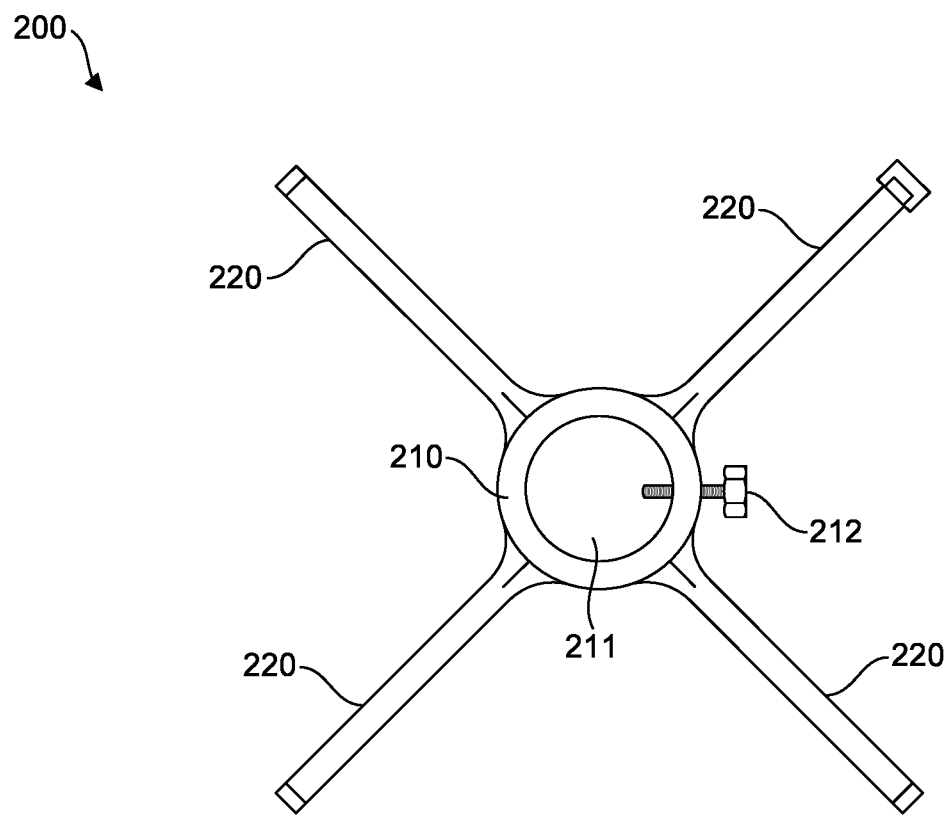
FIG. 2B illustrates an elevational top view of a main body, according to another exemplary embodiment of the present general inventive concept.

FIG. 2B illustrates an elevational top view of a main body 210, according to another exemplary embodiment of the present general inventive concept.

The metal cutting device 200 may be constructed from at least one of metal, plastic, wood, ceramic, and rubber, etc., but is not limited thereto. Additionally, the metal cutting device 200 may be highly durable and withstand high heat temperatures commonly found in a metal working environment. In other words, the metal cutting device 200 may be stable and not melt despite exposure to heat.

The metal cutting device 200 may include a main body 210, a plurality of legs 220, a plurality of wheel assemblies 230, a handle assembly 140, and a torch 150, but is not limited thereto.

The main body 210 may have a predetermined size. For example, a diameter of the main body 210 may be one inch and have a width of one half of an inch, but is not limited thereto.

The main body 210 may include a torch receiving aperture 211 and a torch fastener 212, but is not limited thereto.

Referring to FIG. 2B, the torch receiving aperture 211 is illustrated to have a circular shape. However, the torch receiving aperture 211 may be rectangular, conical, triangular, pentagonal, hexagonal, heptagonal, octagonal, or any other shape known to one of ordinary skill in the art, but is not limited thereto.

The torch receiving aperture 211 may be disposed on and/or within at least a portion of a center of the main body 210. Also, the torch receiving aperture 211 may have a predetermined size, such as five-eighths of an inch in diameter and three-sixteenths of an inch thick.

The torch fastener 212 may be disposed on at least a portion of the main body 210. Moreover, the torch fastener 212 may move within the torch receiving aperture 211 toward a center of the torch receiving aperture 211 in response to rotation of the torch fastener 212 in a first rotational direction (i.e. clockwise) or a second rotational direction (i.e. counterclockwise), and move away from (i.e. out of) the torch receiving aperture 211 in response to rotation of the torch fastener 212 in the second rotational direction or the first rotational direction.

Each of the plurality of legs 220 may include a first section 221, a second section 222, and a section fastener 223, but is not limited thereto.

Referring again to FIG. 2B, the first section 221 may be pivotally disposed at a first end on at least a portion of the main body 210. More specifically, the first section 221 may have a spring to connect to the main body 210 and/or a hinge to connect to the main body 210, such that the first section 221 may pivot in a first vertical direction (i.e. up) or a second vertical direction (i.e. down) with respect to a planar surface (e.g., a metal plate, a metal bar, a metal rod, etc.). For example, the plurality of legs 220 may suspend the main body 210 over the planar surface.

Additionally, a second end of the first section 221 may be removably connected to a first end of the second section 222 via the section fastener 223. Also, the second section 222 may adjust a height of the main body 210 with respect to the planar surface using the section fastener 223. Specifically, the second section 222 may adjust the height of the main body 210 toward the first end of the second section 222 or a second end of the second section 222, by moving the first section 221 at a different position on the second section 222 using the section fastener 223.

Each of the plurality of wheel assemblies 230 may include a wheel 231 and a wheel fastener 232, but is not limited thereto.

The wheel fastener 232 may include a screw, a nail, a nut, a bolt, a washer, a magnet, an adhesive, and/or any combination thereof, but is not limited thereto.

Each of the plurality of wheel assemblies 230 may be removably connected to at least one of the plurality of legs 220. More specifically, the wheel 231 may be removably connected to at least one of the plurality of legs 220 via the wheel fastener 232. The wheel 231 may rotate in response to a force applied thereto, such as pushing and/or pulling of the main body 210 and/or at least one of the plurality of legs 220.

The handle assembly 140 and/or the torch 150 are identical to the metal cutting device 100, and have been described above.

Figure 3:
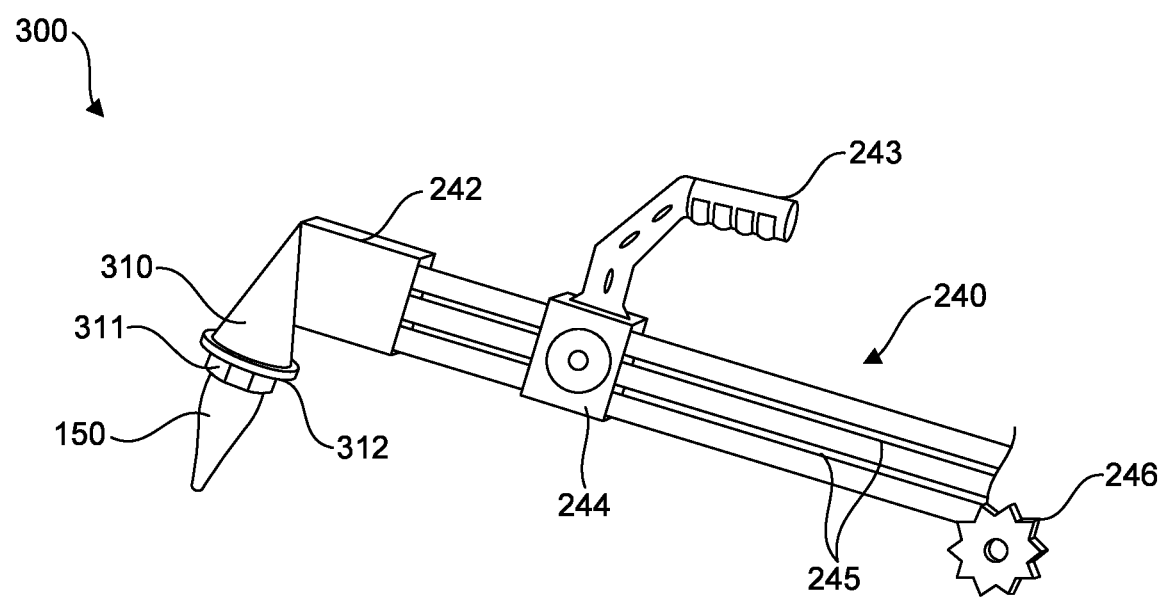
FIG. 3 illustrates a side perspective view of a metal cutting device, according to another exemplary embodiment of the present general inventive concept.

FIG. 3 illustrates a side perspective view of a metal cutting device 330, according to another exemplary embodiment of the present general inventive concept.

The metal cutting device 300 may be constructed from at least one of metal, plastic, wood, ceramic, and rubber, etc., but is not limited thereto. Additionally, the metal cutting device 300 may be highly durable and withstand high heat temperatures commonly found in a metal working environment. In other words, the metal cutting device 300 may be stable and not melt despite exposure to heat.

The metal cutting device 300 may include a main body 310, a handle assembly 340, and a torch 150, but is not limited thereto.

The main body 310 may have a predetermined size.

The main body 310 may include a torch receiving aperture 311 and a torch fastener 312, but is not limited thereto.

Referring to FIG. 3, the torch receiving aperture 311 is illustrated to have a circular shape. However, the torch receiving aperture 311 may be rectangular, conical, triangular, pentagonal, hexagonal, heptagonal, octagonal, or any other shape known to one of ordinary skill in the art, but is not limited thereto.

The torch receiving aperture 311 may be disposed on and/or within at least a portion of a center of the main body 310.

The torch fastener 312 may be disposed on at least a portion of the main body 310. Moreover, the torch fastener 312 may move (i.e. rotate) in a first rotational direction (i.e. clockwise) or a second rotational direction (i.e. counter-clockwise), and move in response to rotation of the torch fastener 212 in the second rotational direction or the first rotational direction.

The handle 240 may include a handle body 241, a handle connector 242, a grip portion 243, a movable portion 244, a plurality of handle tracks 245, and a handle gear 246, but is not limited thereto.

The handle body 241 may have a predetermined size (i.e. length and width) based on a safety determination during cutting of the planar surface.

The handle connector 242 may be disposed on at least a portion of a first end of the handle body 241. The handle connector 242 may removably connect the handle body 241 to the main body 310.

The grip portion 243 may be movably (i.e. slidably) disposed on at least a portion of the handle body 241 via the movable portion 244. In other words, the grip portion 243 may move in response to movement of the movable portion 244. The grip portion 243 may facilitate gripping thereof. As such, the grip portion 243 may be used to move the main body 310. For example, the main body 310 may rotate at any angle on the planar surface in response to movement of the handle assembly 240 with respect to a direction of movement along the planar surface, such that different angles and/or degrees may be cut on the planar surface.

The plurality of handle tracks 245 may be disposed on at least a portion of the handle body 241. Also, the movable portion 244 may move along an entire length of the plurality of handle tracks 245. In other words, the plurality of handle tracks 245 may facilitate movement of the movable portion 244 thereon.

Furthermore, the handle gear 246 may be disposed on at least a portion of a second end of the handle body 241. Alternatively, the movable portion 244 may move in response to rotation of the handle gear 246. Specifically, the handle gear 246 may prevent rapid movement of the movable portion 244 along the plurality of handle tracks 245.

The torch 150 may be locked within the main body 310 in response to rotating the torch fastener 312 in the first rotational direction, and unlocking in response to rotating the torch fastener 312 in the second rotational direction.

Figure 4:
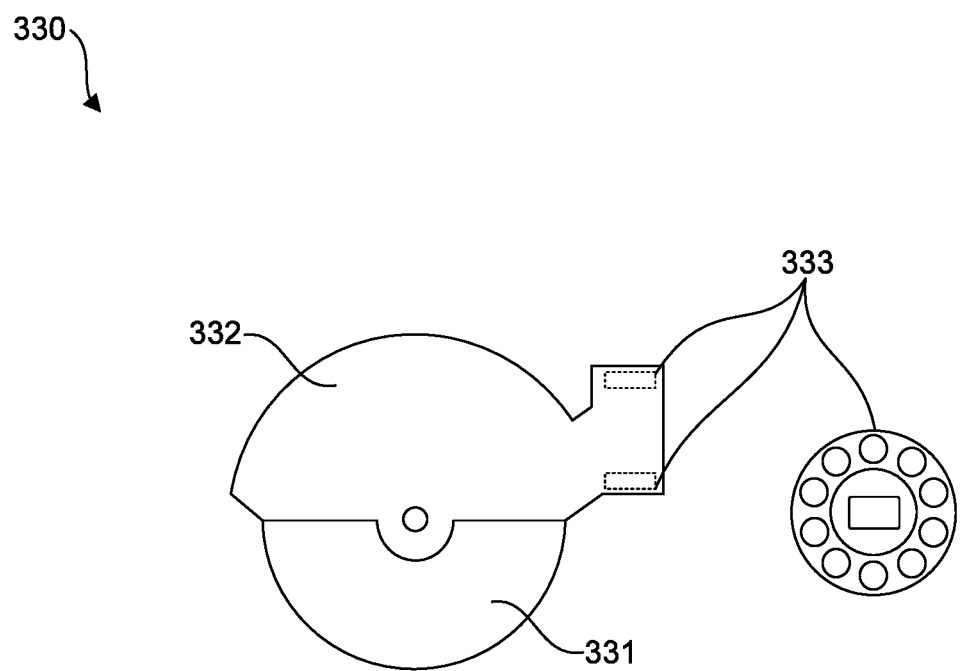
FIG. 4 illustrates a side perspective view of a wheel assembly, according to another exemplary embodiment of the present general inventive concept.

FIG. 4 illustrates a side perspective view of a wheel assembly 330, according to another exemplary embodiment of the present general inventive concept.

The wheel assembly 330 may include wheel 331, a cover 332, and a bearing 333, but is not limited thereto.

The wheel assembly 330 may be removably disposed on at least a portion of the plurality of legs 120 and/or the plurality of legs 220, instead of the wheel assembly 130 and/or the wheel assembly 230, respectively.

The wheel 331 may rotate in response to movement of the plurality of legs 120 and/or the plurality of legs 220 while connected thereto.

The cover 332 may prevent damage to the wheel 331. Finally, the bearing 333 may facilitate rotation of the wheel 331 by preventing friction therein.

Figure 5:
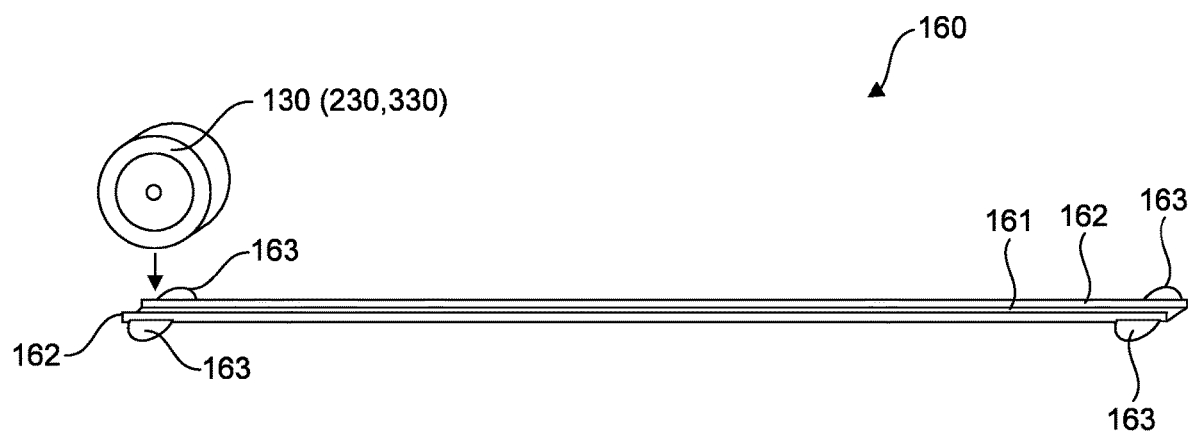
FIG. 5 illustrates a perspective view of a wheel track, according to another exemplary embodiment of the present general inventive concept.

FIG. 5 illustrates a perspective view of a wheel track 160, according to another exemplary embodiment of the present general inventive concept.

The wheel track 160 may include a wheel receiving surface 161, a plurality of rims 162, and a plurality of magnets 163, but is not limited thereto.

The wheel track 160 may be used with the metal cutting device 100 and/or the metal cutting device 200. More specifically, the wheel receiving surface 161 may receive the wheel 131, the wheel 231, and/or the wheel 331 thereon. Moreover, the wheel receiving surface 161 may be smooth to facilitate rotation of the wheel 131, the wheel 231, and/or the wheel 331.

Moreover, the plurality of rims 162 may be disposed along a first edge of the wheel receiving surface 161 and/or a second edge of the wheel receiving surface 161 opposite with respect to the first edge. In other words, the plurality of rims 162 may be in parallel to each other, such that the wheel receiving surface 161 may be disposed between the plurality of rims 162. As such, the plurality of rims 162 may prevent the wheel 131, the wheel 231, and/or the wheel 331 from moving off the wheel receiving surface 161.

The plurality of magnets 163 may be disposed on at least a portion of a first end of the wheel receiving surface 161 and/or a second end of the wheel receiving surface 161. Additionally, the plurality of magnets 163 may prevent movement of the wheel receiving surface 161 away from the planar surface due to being magnetically attracted the planar surface. As such, the plurality of magnets 163 may allow the wheel 131, the wheel 231, and/or the wheel 331 to move linearly along the wheel receiving surface 161.

Therefore, the metal cutting device 100, the metal cutting device 200, and/or the metal cutting device 300 may provide precise cutting of metal. Also, the metal cutting device 100, the metal cutting device 200, and/or the metal cutting device 300 may keep the torch 150 steady during cutting.

The present general inventive concept may include a metal cutting device 100, including a main body 110, a plurality of legs 120 pivotally disposed on at least a portion of the main body 110 to suspend the main body 110 over a surface, a handle assembly 140 removably connected to at least a portion of the main body 110 to facilitate gripping thereof, and a torch 150 removably connected within at least a portion of the main body 110 to cut the surface in response to contact with the surface.

The main body 110 may include a torch receiving aperture 111 to receive the torch 150 therethrough, and a torch fastener 112 movably disposed on at least a portion of the main body 110 to prevent movement of the torch 150 in response to moving the torch fastener 112 toward a center of the torch receiving aperture 111, and allow movement of the torch 150 in response to moving the torch fastener 112 away from the center of the torch receiving aperture 111.

Each of the plurality of legs 220 may include a first section 221 pivotally disposed at a first end to at least a portion of the main body 210 to pivot in a first direction away from the surface and pivot in a second direction toward the surface, a second section 222 removably connected at a first end to a second end of the first section 221 to adjust a height of the main body 210 with respect to the surface by moving the moving the main body 210 toward the first end of the second section 222, and moving the main body 210 toward a second end of the second section 222 in response to moving the first section 221 along a length of the second section 222, and a section fastener 223 removably connected to the first section 221 and the second section 222 to allow the second section 222 to adjust the height of the main body 210 in response to movement of the first section 221 along the length of the second section 222.

The handle assembly 140 may include a handle body 141, a handle connector 142 disposed on at least a portion of a first end of the handle body 141 and removably connected to the torch 150, and a grip portion 143 disposed on at least a portion of a second end of the handle body 141 to facilitate gripping thereof.

The handle assembly 140 may further include a handle lever 144 disposed on at least a portion of the grip portion 143 to adjust a strength of the torch 150 in response to moving the handle lever 144.

The handle assembly 240 may further include a movable portion 244 connected to the grip portion 243, and a plurality of handle tracks 245 disposed on at least a portion of the handle body 241 to facilitate movement of the movable portion 244 along at least a portion of a length of the handle body 241.

The metal cutting device 100 may further include a plurality of wheel assemblies 130 removably connected to each of the plurality of legs 120 to rotate against the surface in response to an application of force thereto.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A metal cutting device, comprising:
   a main body;
   a plurality of legs pivotally disposed on at least a portion of the main body to suspend the main body over a surface, each of the plurality of legs comprising:
   a first section pivotally disposed at a first end to at least a portion of the main body to pivot in a first direction away from the surface and pivot in a second direction toward the surface,
   a second section removably connected at a first end to a second end of the first section to adjust a height of the main body with respect to the surface by moving the moving the main body toward the first end of the second section, and moving the main body toward a second end of the second section in response to moving the first section along a length of the second section, and
   a section fastener removably connected to the first section and the second section to allow the second section to adjust the height of the main body in response to movement of the first section along the length of the second section;
   a handle assembly removably connected to at least a portion of the main body to facilitate gripping thereof; and
   a torch removably connected within at least a portion of the main body to cut the surface in response to contact with the surface.

2. The metal cutting device of claim 1, wherein the main body comprises:
   a torch receiving aperture to receive the torch therethrough; and
   a torch fastener movably disposed on at least a portion of the main body to prevent movement of the torch in response to moving the torch fastener toward a center of the torch receiving aperture, and allow movement of the torch in response to moving the torch fastener away from the center of the torch receiving aperture.

3. The metal cutting device of claim 1, wherein the handle assembly comprises:
   a handle body;
   a handle connector disposed on at least a portion of a first end of the handle body and removably connected to the torch; and
   a grip portion disposed on at least a portion of a second end of the handle body to facilitate gripping thereof.

4. The metal cutting device of claim 3, wherein the handle assembly further comprises:

a handle lever disposed on at least a portion of the grip portion to adjust a strength of the torch in response to moving the handle lever.

5. The metal cutting device of claim 3, wherein the handle assembly further comprises:
a movable portion connected to the grip portion; and
a plurality of handle tracks disposed on at least a portion of the handle body to facilitate movement of the movable portion along at least a portion of a length of the handle body.

6. The metal cutting device of claim 1, further comprising:
a plurality of wheel assemblies removably connected to each of the plurality of legs to rotate against the surface in response to an application of force thereto.

7. A metal cutting device, comprising:
a main body;
a plurality of legs pivotally disposed on at least a portion of the main body to suspend the main body over a surface;
a handle assembly removably connected to at least a portion of the main body, the handle assembly comprising:
a handle body,
a handle connector disposed on at least a portion of a first end of the handle body,
a grip portion disposed on at least a portion of a second end of the handle body to facilitate gripping thereof,
a movable portion connected to the grip portion, and
a plurality of handle tracks disposed on at least a portion of the handle body to facilitate movement of the movable portion along at least a portion of a length of the handle body; and
a torch removably connected within at least a portion of the main body to cut the surface in response to contact with the surface.

* * * * *